May 11, 1965 J. W. OGLE 3,182,612
PELLETING APPARATUS
Filed Aug. 26, 1963 2 Sheets-Sheet 1
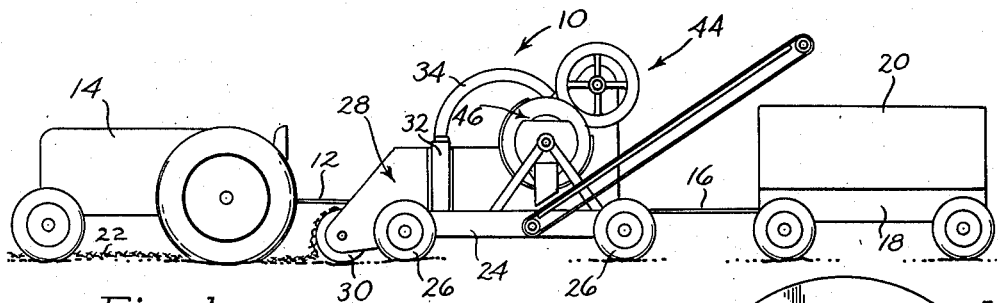
Fig. 1.
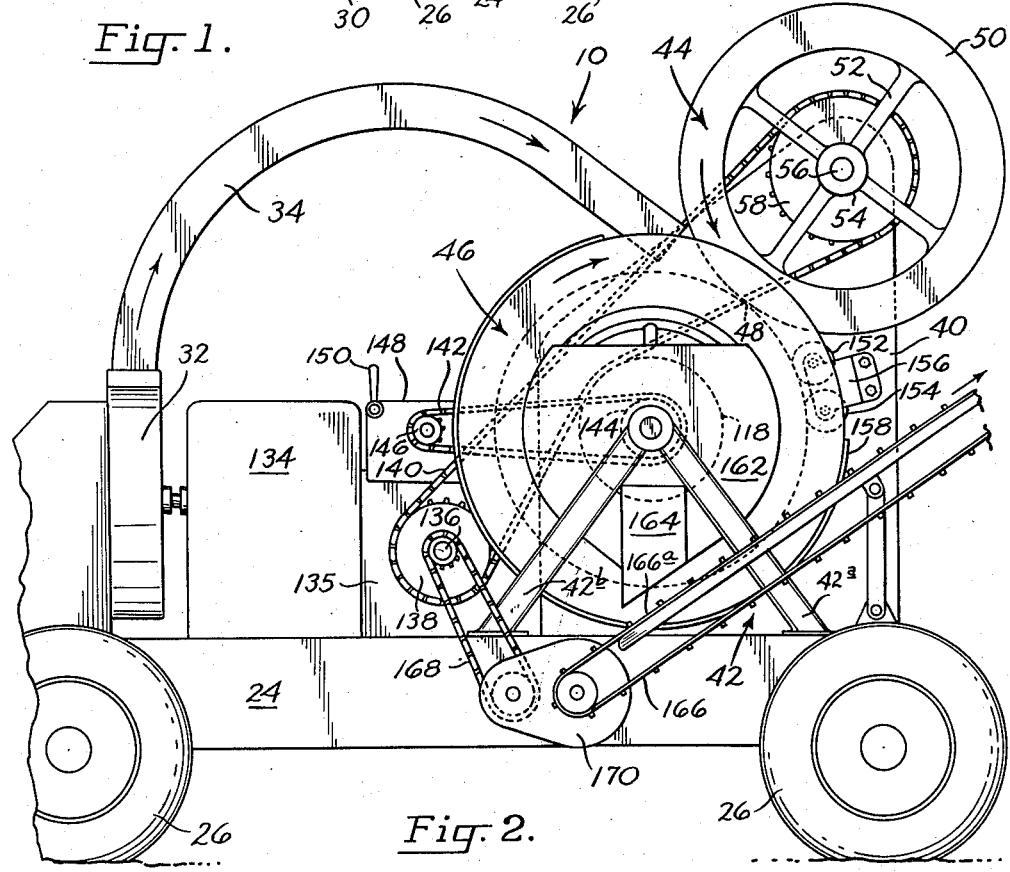
Fig. 2.
Fig. 7.
Fig. 8.
James W. Ogle
INVENTOR.
BY Ramsey, Kolisch + Hartwell
Attys.

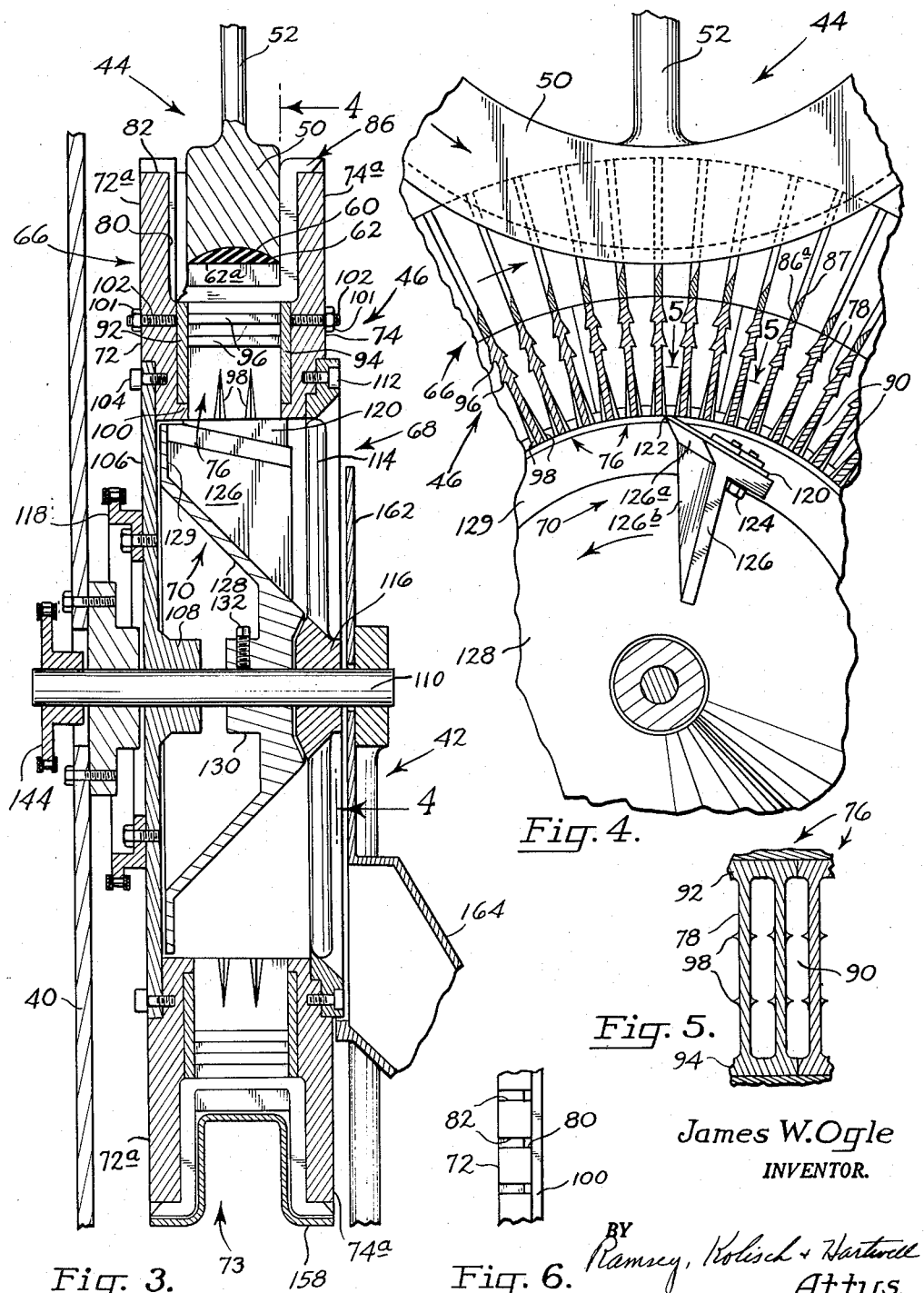

3,182,612
PELLETING APPARATUS
James W. Ogle, Rte. 6, Box 40, Lakeview, Oreg.
Filed Aug. 26, 1963, Ser. No. 304,347
8 Claims. (Cl. 107—14)

This invention relates to pelleting apparatus generally, and more specifically to improvements in apparatus for forming pellets of hay or other types of forage materials.

With the increasing mechanization that has taken place in the field of agriculture, it has become apparent that economies are possible if forage material is pelletized after it is cut, so that self-contained units of the material are formed. Pellets of hay lend themselves to relatively easy mechanical handling, are conveniently fed to livestock, are stored with minimum difficulty, and have other advantages. Forming pellets of forage material, however, is practical for the average farmer only if the equipment needed is simple and trouble-free in operation. Further, particularly if the equipment is to be used in the field, excessive weight and mass is undesirable.

Generally, an object of this invention is to provide apparatus suitable for pelleting hay, and other forage materials, which meets the requirements above indicated.

Most types of pelleting equipment presently known have relied either upon auger devices for forcing material through suitable extrusion passages, or complicated ram systems which are operated to compact forage material to proper density, whereby the pellets desired may be formed. Such types of apparatus require considerable power to run them, are often so massive as to be unsuitable for field use, and generally are quite expensive.

According to this invention, pelleting equipment or apparatus is contemplated which features a rotatable pellet-forming wheel, with plural extrusion passages distributed circumferentially thereon that communicates with the periphery of the wheel. Means is provided for feeding forage material against the periphery of this wheel, and then for compacting the material fed by forcing the material radially inwardly through said passages. The apparatus can be operated continuously, with the continuous formation of pellets as the material compacts and passes through the extrusion passages. The apparatus may be devoid of complicated piston devices, or other reciprocating means, for producing compaction pressures. Furthermore, it may be constructed in such compact form as to be easily transported over the field.

A more specific object of the invention, therefore, is to provide pelleting apparatus that comprises a pair of opposed wheels, mounted in positions where their peripheries come together and form a bite between the wheels. In the forming of pellets, material is directed into this bite to be compacted. One of the wheels comprises a compacting wheel, and operates to force material radially inwardly on the other wheel. The other wheel comprises a pellet-forming wheel, and includes extrusion passages distributed circumferentially thereon through which forage material travels as the same is compacted. The power required to operate the apparatus comprises essentially that power which is needed to turn the two wheels, such being operable to produce both compaction and extrusion.

Another object and feature is to provide such pelleting equipment, where the pellet-forming wheel referred to generally above is provided with an annular groove about the perimeter thereof, which in a manner of speaking provides a trough for receiving the forage material to be processed into pellet form. The compacting wheel includes an annular portion which fits within this trough of the pellet-forming wheel at the bite of the wheels, thus to produce compacting pressure at the bite.

A further object of the invention is to provide pelleting apparatus comprising a pellet-forming wheel, including plural circumferentially distributed extrusion passages, where such extrusion passages have feed or receiving ends that communicate with the periphery of the wheel, and progressively constrict in a radially inward direction, to terminate in discharge openings spaced radially inwardly on the wheel. Forage material, as the same travels through these passages, is further compacted by reason of such constriction. The passages are constructed in such a manner as to tend to inhibit movement of material in the passages in a radially outward direction.

Yet a further object is to provide pellet-forming apparatus, that features novel knife structure (which may be replaceable) distributed about the pellet-forming wheel, which performs the function of initially dividing the forage material into discrete masses which are later formed into pellets.

A still further object is to provide pelleting apparatus, with novel means for varying the size of the pellets formed.

And yet another object is to provide novel means defining extrusion passages in a pellet-forming wheel.

These and other general objects and advantages are attained by the invention, and reference is now made to the accompanying drawings, which illustrate an embodiment of the invention, wherein:

FIG. 1 is a side elevation, somewhat simplified, showing pelleting apparatus, with such apparatus drawn after a tractor, as it would be employed in field use;

FIG. 2 is a side elevation, drawn on a larger scale, illustrating in more detail the mechanism for producing pellets in the apparatus;

FIG. 3 is a cross-sectional view taken through a pellet-forming wheel in the apparatus, drawn on an even larger scale;

FIG. 4 is a cross-sectional view of the pellet-forming wheel, taken generally along the line 4—4 in FIG. 3;

FIG. 5 is a cross-sectional view of portions of the pellet-forming wheel, taken generally along the line 5—5 in FIG. 4;

FIG. 6 is a view of portions of one edge of the pellet-forming wheel, with knife elements that are provided in the apparatus removed;

FIG. 7 is a view showing a vane assembly that may be provided in the apparatus; and FIG. 8 is a view illustrating a removable knife element.

Referring now to the drawings, and first of all more particularly to FIG. 1, at 10 is indicated generally pelleting apparatus which is connected by draft means 12 to a tractor 14 which is used to draw the apparatus over the field. Coupled to the rear of the pelleting apparatus, by draft means 12 to a tractor 14 which is used to draw the apparatus over the field. Coupled to the rear of the pelleting apparatus, by draft means 16, is a wheeled wagon 18 with a hollow body 20 which is provided for the purpose of collecting and holding pellets as they are formed.

As illustrated in FIG. 1, tractor 14 is employed to draw the apparatus along a windrow of conditioned hay. Thus, before pellets are formed from the forage material, the material is first cut and conditioned, and formed into a windrow, by the usual "windrower" (not shown). Such a windrow of conditioned hay is indicated in FIG. 1 at 22.

Apparatus 10 briefly discussed above includes a mobile frame 24, supported for movement over the ground by lateral support wheels, such as those indicated at 26. Mounted on the frame 24, adjacent the forward end of the apparatus, is a chopper unit 28, which may be of conventional construction. Thus the unit may include, adjacent the ground and the forward end thereof, the usual pickup roller 30, which is effective to pick up the windrow of conditioned hay as the unit is drawn thereinto, and pass such conditioned material to the chopper knives of the unit (not shown), which are operable to produce fully chopped and conditioned hay. Adjacent the rear of the chopper unit is an impeller or blower 32, which receives the chopped and conditioned hay, and forces the same upwardly and to the rear of the apparatus, through a chute 34.

In the pelleting of hay or other forage materials, the age of the material to be pelletized, the extent to which such material is conditioned, its moisture content, etc. are factors that control the type of pellet produced. These different considerations, of course, are well known to those skilled in the art. The apparatus of this invention is operable to take properly conditioned material leaving chute 34, such having suitable moisture, and otherwise in condition for pelleting, and convert this material into pellets or "biscuits," where the material takes the form of self-contained units, suitable for feeding to livestock, and other agricultural uses.

More specifically, and referring now more particularly to FIGS. 2, 3, and 4, adjacent the rear end of and secured to frame 24 is an upstanding frame plate 40. Also fastened to frame 24, and spaced to one side of frame plate 40, is an upstanding standard 42, having legs 42a, 42b. Frame plate 40 and standard 42 provide means for mounting a pair of opposed wheels, indicated generally at 44, 46, and referred to herein as "compacting" and "pellet-forming" wheels, respectively.

These wheels are mounted with the peripheries of the wheels coming together and defining a bite for the wheels, in the area indicated generally at 48 in FIG. 2. As will now be described, material from which pellets are to be produced is fed into this bite between the two wheels, where the material is compacted and forced through extrusion passages, ultimately to become pellets upon the material leaving the passages.

Considering first of all the construction of compacting wheel 44, this wheel may comprise, as in the embodiment illustrated, an annular rim section 50, and spokes 52 which join the rim section to a hub, indicated at 54. The hub of the wheel is journaled at 56 on frame plate 40. Secured to the hub of the wheel, and also journaled on the frame plate, is a sprocket 58, which is employed to rotate the wheel.

The periphery of wheel 44 is utilized to compress material against wheel 46. As best shown in FIG. 3, rim section 50 may be provided with a shallow groove, such as that shown at 60, extending about the perimeter thereof. Extending about the rim section and seated within this groove is an annular pad member 62, which may be made of hard rubber or other elastomeric material. Outer face 62a of this pad member, upon rotation of the wheel, contacts the material to be processed and compacts it.

Pellet-forming wheel 46 comprises a rim section 66, mounting means 68 which supports the rim section while accommodating rotation of the wheel, and cutter means 70 within the wheel which is actuated to cut off extruded material to form pellets or biscuits. Each of these will now be described in more detail.

Considering first of all rim section 66, in the form of the invention illustrated, the rim section comprises a pair of annular rim elements 72, 74, mounted opposite each other and axially spaced from each other. Wall portions 72a, 74a of the rim elements, as most clearly seen at the bottom of FIG. 3, form annular flanges that define an annular groove 73 extending about the perimeter of the pellet-forming wheel. Between wall portions 72a, 74a, and circumferentially distributed about the wheel, are vane assemblies 76 (one of which is shown detached from the wheel in FIG. 7) having vanes 78 that define radially extending extrusion passages 90 in the pellet-forming wheel.

Further describing the rim elements and associated structure, each rim element (as seen with reference to rim element 72 in FIGS. 3 and 6) is provided with a series of radially extending channels 80 circumferentially distributed about the element and formed on the inner face thereof. Each channel 80 has a channel 82 joining therewith extending in an axial direction across the outer edge of the rim element. For each pair of channels 80, 82 in one rim element there is a complementing pair of similar channels in the rim element opposite. Complementing pairs of channels in the two rim elements provide a means for seating a replaceable knife element 86, one of which is shown detached from the wheel in FIG. 8.

Each knife element, as shown in FIG. 8, includes a central or knife blade portion 86a, with a sharpened top edge 87 (see FIG. 4), and opposed legs 86b. Joined to the top of these legs are ends 86c. Each knife element is snugly seated in place by placing its central portion at the base of a pair of complementing channels 80, and its ends 86c in a pair of complementing channels 82.

As shown in FIG. 4, the knife elements, since they have their sharpened edges facing radially outwardly on the pellet-forming wheel, are operable to produce initial division of material compacted at the bite of the wheels and forced radially inwardly on the pellet-forming wheel. Extrusion passages 90, defined between vanes 78, are located radially inwardly of portions 86a of the knife elements.

Vanes 78 are part of removable vane assemblies 76. In the embodiment illustrated (see FIG. 7) five of such vanes are provided in each vane assembly, although obviously the specific number may be varied. The vane assemblies are made removable, to accommodate replacement of an assembly should one or more of the vanes therein become damaged. The vanes comprise webs of material extending between opposed walls 92, 94 in each assembly which form the ends of the assembly. Opposite faces of two adjacent vanes define two sides of each extrusion passage, and the opposed inner faces of walls 92, 94 define two more sides of each extrusion passage.

The vanes may be provided with axially extending ridges 96, which define a barbed outline for the vanes when they are viewed in cross section, in FIG. 4. These ridges function to inhibit movement of material radially outwardly in the extrusion passages while affording relatively easier radially inward movement because of the above described barbed outline. Adjacent the base of each vane and extending in a radial direction on the wheel, are dividers 98. The dividers of each vane flare outwardly from the rest of the vane, progressing radially inwardly on the wheel. As best illustrated in FIG. 5, when material is forced downwardly through an extrusion passage 90, the dividers may function to form creases in the extruded material, with the material thus being weakened and easily broken along these creases.

The extrusion passages constrict progressing radially inwardly on the pellet-forming wheel, as seen in FIG. 4. With this constriction, material undergoes additional compaction on moving through the passages.

Each vane assembly is mounted in rim section 66 with the same supported on shoulder portions 100 provided at radially inner portions of the two rim elements. In FIG. 3, threaded studs 102 integral with a vane assembly and extending through the rim elements, and nuts 101 screws on these studs, as shown securing a vane assembly in place. Obviously, however, other means of attachment could be used.

While removable knife elements have been described, as well as removable vane assemblies with plural vanes, other forms of construction are possible. For instance, for some uses it may be desirable to form the rim section as one piece, with the knife elements, vanes, and rim elements all then being integral. Alternatively, only the knife elements may be replaceable. As a still further modification, each of the vanes may be replaceable as an individual piece.

The feed ends of the extrusion passages coincide with the location of the sharpened edges of the knives, for it is in this region that material starts to enter the passages. Material leaves the passages adjacent the radially inner edges of the vanes, which may be thought of as the location of the discharge ends of the passages.

Considering now means 68 mounting rim section 66, rim element 72 is secured, by fasteners such as fastener 104, to a circular plate 106 journaled at 108 on a shaft 110. Rim element 74 is secured, by fasteners such as fastener 112, to a spoked assembly 114 journaled at 116 on shaft 110. Shaft 110 is journaled in frame plate 40 and standard 42, respectively. The structure described accommodates rotation of the pellet-forming wheel, about an axis paralleling the axis of rotation for compacting wheel 44.

In the operation of the apparatus, the pellet-forming wheel is rotated under power. A sprocket 118 which is secured to plate 106 provides a means for rotating the pellet-forming wheel.

Referring now to FIGS. 3 and 4, and considering cutter means 70, at 120 there is indicated a knife cutter with sharpened edge 122. As can be seen in FIG. 4, the knife cutter is disposed at an angle relative to the inner surface of rim section 66. Knife cutter 120 is mounted, by fasteners 124, to a mounting 126. Mounting 126 is provided with forward surfaces 126a, 126b disposed at an angle relative to the axis of the wheel, which produce a plowing action on relative movement of the cutter means and pellet-forming wheel. Mounting 126, together with the knife that it supports, is joined to a deflector including cone element 128 and flange 129, and these are fastened thorugh a hub portion 130, and by fasteners 132, to shaft 110.

During operation of the pellet-forming apparatus, the pellet-forming wheel and compacting wheel are rotated in the directions indicated by the arrows in FIG. 2. The wheels are rotated under power by means of a motor 134 (which drives impeller 32) mounted on frame 24, which through power transmission 135 and an output shaft 136 is connected to a sprocket 138. A chain 140 connects sprocket 138 with sprockets 118, 58 connected to wheels 46, 44, as already described.

The knife cutter is rotated within the pellet-forming wheel, and by moving over the discharge ends of the extrusion passages, cuts off material as the same is extruded therefrom. The knife cutter moves at such a speed that protrusions of compacted material of suitable length protrude beyond the passages before they are cut off. Assuming, by way of example, that with a fully loaded extrusion passage it takes three additional passes through the bite of the wheels for a sufficient amount of compacted material to be collected to produce the desired protrusion from the extrusion passage, than the cutter means would be rotated within the pellet-forming wheel in the same direction as the pellet-forming wheel, but at a speed which is two-thirds the speed of the pellet-forming wheel. This would result in relative movement of the cutter means with respect to the pellet-forming wheel, in the direction of the arrow in FIG. 4, of 120° each time the pellet-forming wheel rotates once, and production of the desired protrusions.

Means is provided for rotating the knife cutter comprising a chain 142 (see FIG. 2) which is trained over a sprocket 144 secured to shaft 110 and a sprocket 146 secured to the output shaft of a variable speed transmission 148. Motor 134 is operatively connected to the input of transmission 148. To produce a change in the relative movement of the knife cutter, and thus a change in the size of the pellets produced, the variable speed transmission is adjusted, by manipulation of control handle 150.

Still referring to FIG. 2, mounted to the right of bite 48, are a pair of rollers 152, 154. These are journaled on a bracket 156, secured to frame plate 40. The rollers ride within the annular groove defined about the perimeter of the pellet-forming wheel, and serve to compact again material just forced into the extrusion passages at the bite of the wheels.

Extending from roller 152 downwardly and around the wheel to chute 34, and having the cross section indicated in FIG. 3, is a casing 158 fixed to standard 42. The casing covers annular groove 73 where it extends down and about the base of wheel 46, and functions to keep any loose material from falling out of the various extrusion passages should such be a tendency.

In FIG. 3 it will be noted that the void region within rim section 66 of the pellet-forming wheel is effectively closed off at the left of the wheel by cone 128 and flange 129. Pellets as they are cut off are deflected by the cone, and by gravity, downwardly and toward the right of the wheel. A deflector plate 162 fastened to standard 42 closes off a substantial part of the void region within rim section 66 on the right side of the pellet-forming wheel in FIG. 3. Adjacent the bottom of the deflector plate is a chute 164, which provides a passage which the pellets travel through when they fall from the wheel and to the right in FIG. 3.

Referring again to FIG. 2, a conveyer is shown at 166 driven by output shaft 136 through a chain 168 and transmission 170. The conveyer includes a reach 166a which extends under the bottom of chute 164. On pellets falling from chute 164, they collect on reach 166a, and thence are transported upwardly and to the right in FIG. 2, where the pellets then fall into wagon 18 discussed earlier.

Describing now the operation of the apparatus, properly chopped and conditioned forage material travels through chute 34 and is ejected from this chute into annular groove 73 which is defined about the perimeter of the pellet-forming wheel. The material falls into this annular groove on an upper part of wheel 46 and in advance of bite 48. The flanges defining the sides of groove 73 are effective to contain the forage material as a ribbon deposit on the top of the wheel. As the pellet-forming wheel rotates, it carries the material deposited thereon continuously into bite 48, where wheel 46 and compacting wheel 44 together compact the material, with such being forced radially inwardly on the pellet-forming wheel into the pockets around the wheel provided by extrusion passages 90.

As material continuously collects on the pellet-forming wheel, and upon continued rotation of the wheel and feeding of material thereonto, material collects in the extrusion passages, and ultimately starts to protrude beyond the discharge ends of the extrusion passages. This material is cut off by the cutter means, to form pellets, the cutter means first having been adjusted so as to move within the pellet-forming wheel at the desired speed.

Pellets after they are cut travel downwardly through chute 164 and onto conveyer 166. Thence the pellets are deposited in the wagon that trails the pellet-forming apparatus. It should be obvious that with the apparatus continuous production of pellets is possible, as the apparatus is drawn over a field along a properly conditioned windrow.

While an embodiment of the invention has been described, it should be obvious that variations and changes are possible, without departing from the spirit of the invention. It is desired to cover all organizations and modifications that would be apparent to one skilled in the art, and that come within the scope of the appended claims.

It is claimed and desired to secure by Letters Patent:
1. A pellet forming wheel comprising
   an annular rim section including opposed rim elements
      having opposed axially spaced and radially projecting opposed wall portions, said rim section further including plural vanes disposed in planes extending radially and substantially axially of the annular rim section, circumferentially distributed about said rim section, joined to said wall portions, and extending between them, said wall portions projecting radially beyond the radially outer edges of said vanes and defining a groove extending about the perimeter of said wheel, said vanes and wall portions defining plural extrusion passages extending radially in the wheel with feed ends communicating with the periphery of the wheel adjacent the base of the groove, and an axially extending removable knife element mounted on said wheel associated with each vane, each of said knife elements including a knife blade portion radially outwardly of its associated vane, occupying substantially the plane of such vane, said knife elements having sharpened edges facing outwardly operable to produce initial division of material forced radially inwardly toward said extrusion passages into separate agglomerates spaced along the perimeter of the pellet-forming wheel which are to be turned into pellets.

2. A pellet forming wheel comprising an annular rim section with opposed axially spaced and radially projecting wall portions, said rim section further including plural vanes disposed in planes extending radially and substantially axially of the annular rim section, joined at opposite ends to said wall portions, and extending between the wall portions, said vanes being circumferentially distributed about said rim section and with said wall portions defining plural extrusion passages extending radially in said wheel, said wall portions projecting radially beyond the radially outer edges of said vanes and defining a groove extending about the perimeter of the wheel, said extrusion passages having feed ends communicating with the base of said groove and discharge ends spaced radially inwardly on the wheel, said extrusion passages constricting progressing from their feed to their discharge ends, and an axially extending knife element mounted on said wheel associated with each vane, each of said knife elements including a knife blade portion radially outwardly of its associated vane, occupying substantially the plane of such vane, said knife elements having sharpened edges facing outwardly operable to produce initial division of material forced radially inwardly toward said extrusion passages into separate agglomerates spaced along the perimeter of the pellet-forming wheel which are to be transformed into pellets, said vanes having means on their outer surfaces impeding the flow of material in said extrusion passages in a radially outward direction while affording relatively easier flow of material radially inwardly.

3. In pellet forming apparatus, a pair of opposed wheels with peripheries coming together and defining a bite for the wheels, wheel drive means for rotating the wheels under power, material feed means for feeding material against the peripheries of the wheels and into said bite defined by the wheels, a series of extrusion passages circumferentially distributed about one wheel, said extrusion passages having feed openings communicating with the periphery of said one wheel and discharge openings spaced radially inwardly of said feed openings, means defining a void in said one wheel with which said discharge openings connect, rotatable cutter means in said void for cutting off material after the same is extruded through said passages, and drive means for rotating said cutter means at a different speed from the speed at which said one wheel is rotated by said wheel drive means.

4. The apparatus of claim 3, where the drive means for the cutter means is provided with means for changing the speed at which said cutter means is rotated.

5. Pellet-forming apparatus comprising a rotatable compacting wheel and a rotatable pellet-forming wheel, mounted opposite each other, with the peripheries of the wheels coming together and defining a bite for the wheels, said pellet-forming wheel having plural knife portions distributed circumferentially about the perimeter thereof, with radially outwardly facing edges that substantially parallel the axis of the wheel and extend across the perimeter of the wheel, said knife elements being operable to produce initial division of material into separate agglomerates spaced along the perimeter of the pellet-forming wheel which are to be turned into pellets, means in the pellet-forming wheel defining extrusion passages between successive pairs of knife portions for the forming of pellets, with such passages having feed ends communicating with spaces between successive knife portions and discharge ends located radially inwardly on the pellet-forming wheel, and means formed of an elastomer extending about the outside of said compacting wheel coacting with the knife portions to compact material against said edges thus to bring about forming of separate agglomerates of material to be formed into pellets for moving into the extrusion passages.

6. Pellet-forming apparatus comprising a rotatable compacting wheel and a rotatable pellet-forming wheel mounted opposite each other with the peripheries of the wheels coming together and defining a bite for the wheels, said pellet-forming wheel having a rim section extending about the wheel and said rim section having knife seating means distributed circumferentially thereabout, said pellet forming wheel further comprising detachable knife elements distributed circumferentially on the rim section and seated within said knife seating means, said knife elements having radially outwardly facing edges that substantially parallel the axis of the pellet-forming wheel and that extend across the perimeter of this wheel, said knife edges being operable to produce initial division of material into separate agglomerates spaced along the perimeter of the pellet-forming wheel which are to be formed into pellets, means in the pellet-forming wheel defining extrusion passages between successive pairs of knife portions for the forming of pellets, with such extrusion passages having feed ends communicating with spaces between successive knife portions and discharge ends located radially inwardly on the pellet forming wheel, and means formed of an elastomer about the outside of said compacting wheel coacting with the knife elements to compact material against said edges thus to bring about forming of separate agglomerates of material to be formed into pellets for moving into said extrusion passages.

7. The pellet-forming apparatus of claim 6, wherein the pellet-forming wheel has flanges adjacent its opposite ends forming an annular groove extending about the perimeter of the wheel, said groove receives the compacting wheel at said bite with said means of elastomer disposed within the groove, and said knife elements include legs projecting radially outwardly on the pellet-forming wheel from said edges to adjacent the outer circumferential margin of at least one of said flanges.

8. Pellet-forming apparatus comprising
a pellet-forming wheel including an annular rim section having opposed axially spaced wall portions extending in planes normal to the axis of the wheel, and plural vanes disposed in planes extending radially and substantially axially of the annular rim section, circumferentially distributed about said rim section, joined to said wall portions, and extending between them,
said vanes and wall portions defining plural extrusion passages extending radially in the wheel, and ends of said vanes facing radially in one direction on the wheel defining feed ends for said passages and ends of said vanes facing radially in the opposite direction on the wheel defining discharge ends for said passages,
said rim section further including axially extending removable knife elements mounted on said wheel, one directly in front of the end of each vane which defines the feed end of an extrusion passage, each of said knife elements including a knife blade portion occupying substantially the plane of the vane directly behind the element,
said knife blade portions having cutting edges facing away from the vanes behind them, operable to produce initial division of material when such is forced against the elements into separate agglomerates spaced circumferentially about the annular rim section, and
compacting means movable over said cutting edges for compacting material against said edges.

References Cited by the Examiner

UNITED STATES PATENTS

| | | | |
|---|---|---|---|
| 1,238,981 | 9/17 | Barton. | |
| 2,052,449 | 8/36 | Connell | 107—8.35 |
| 2,177,132 | 10/39 | Crabtree | 107—8.35 |
| 2,427,644 | 9/47 | Field. | |
| 2,570,466 | 10/51 | MacHenry | 83—354 |
| 2,603,170 | 7/52 | Meakin | 107—8.35 |
| 2,648,296 | 8/53 | Oliver. | |
| 2,902,715 | 9/59 | Norman | 18—12 |

FOREIGN PATENTS 1,250,174  11/60  France.

OTHER REFERENCES

Agricultural Engineering, S671.A3, August 1961 (pages 412–415 and 423).

Western Livestock Journal, April 1961 (pages 36 and 39).

WALTER A. SCHEEL, *Primary Examiner.*